Jan. 16, 1934.   P. R. FORMAN   1,943,819
INTERCONNECTED BRAKE AND DOOR SYSTEM FOR VEHICLES
Filed March 19, 1931   5 Sheets-Sheet 5
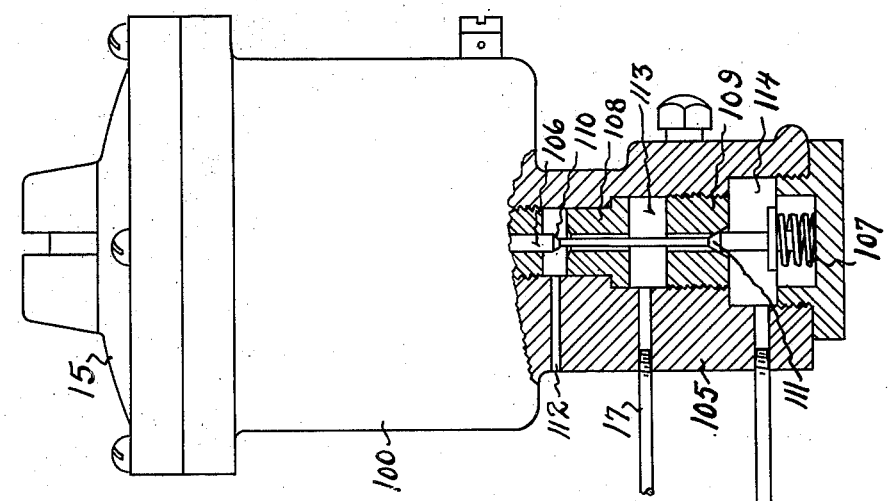
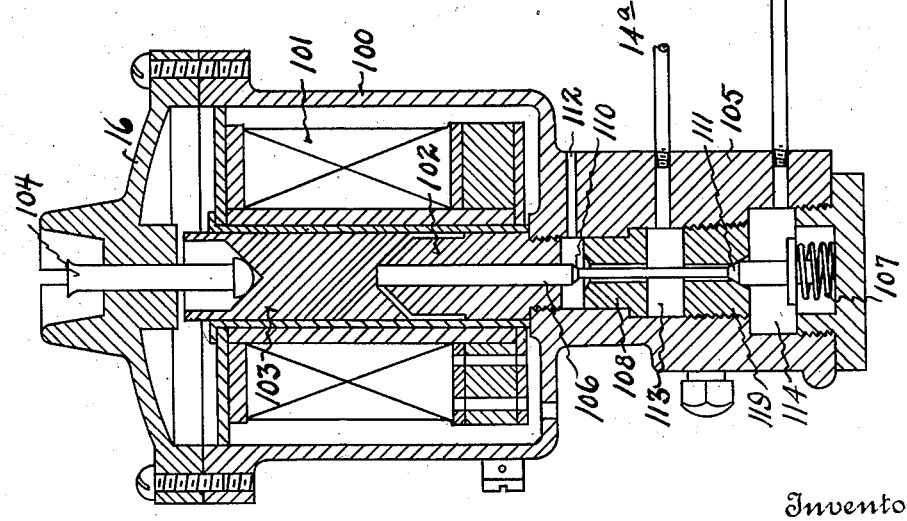
Fig. 7
Inventor
Paris R. Forman
By his Attorneys. Darby & Darby Patented Jan. 16, 1934

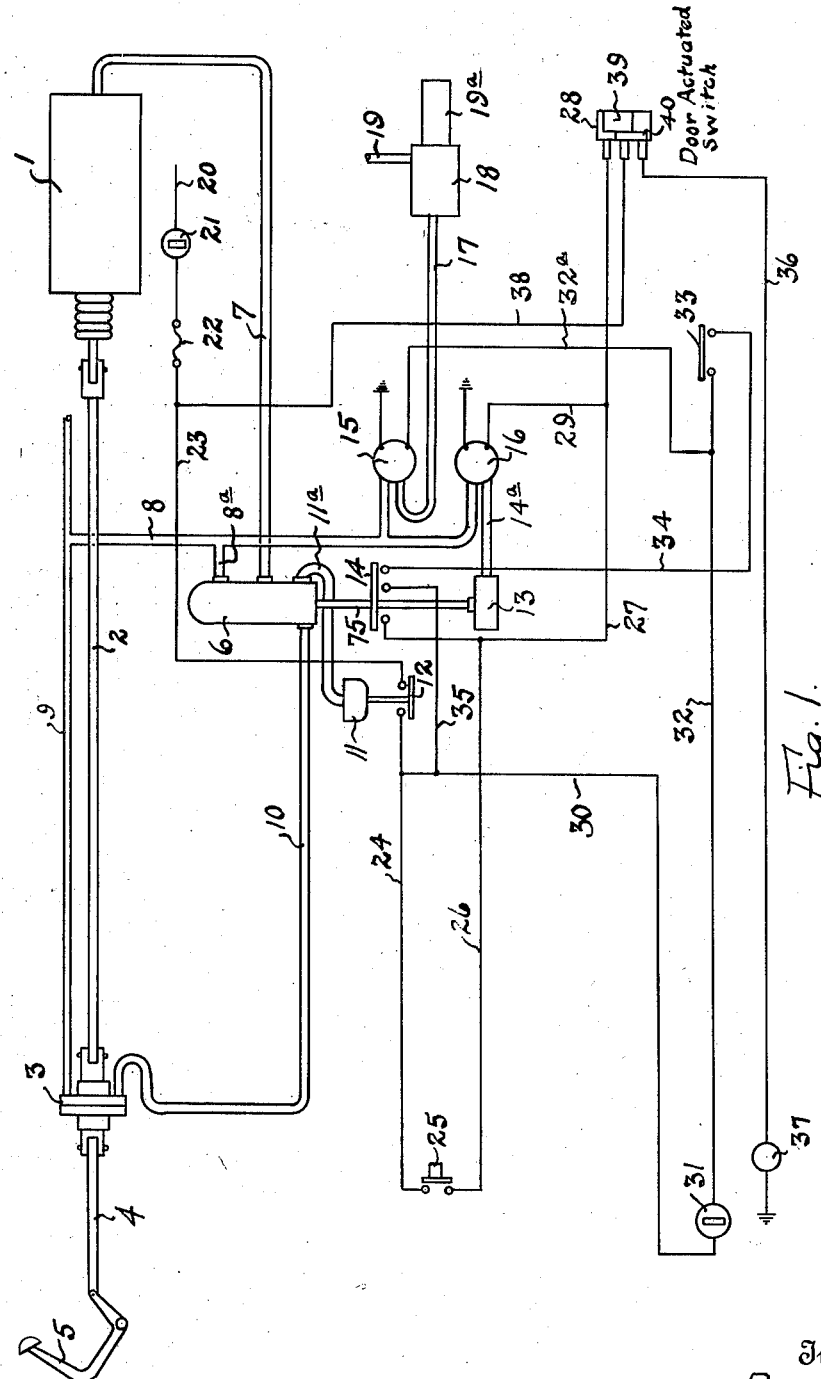

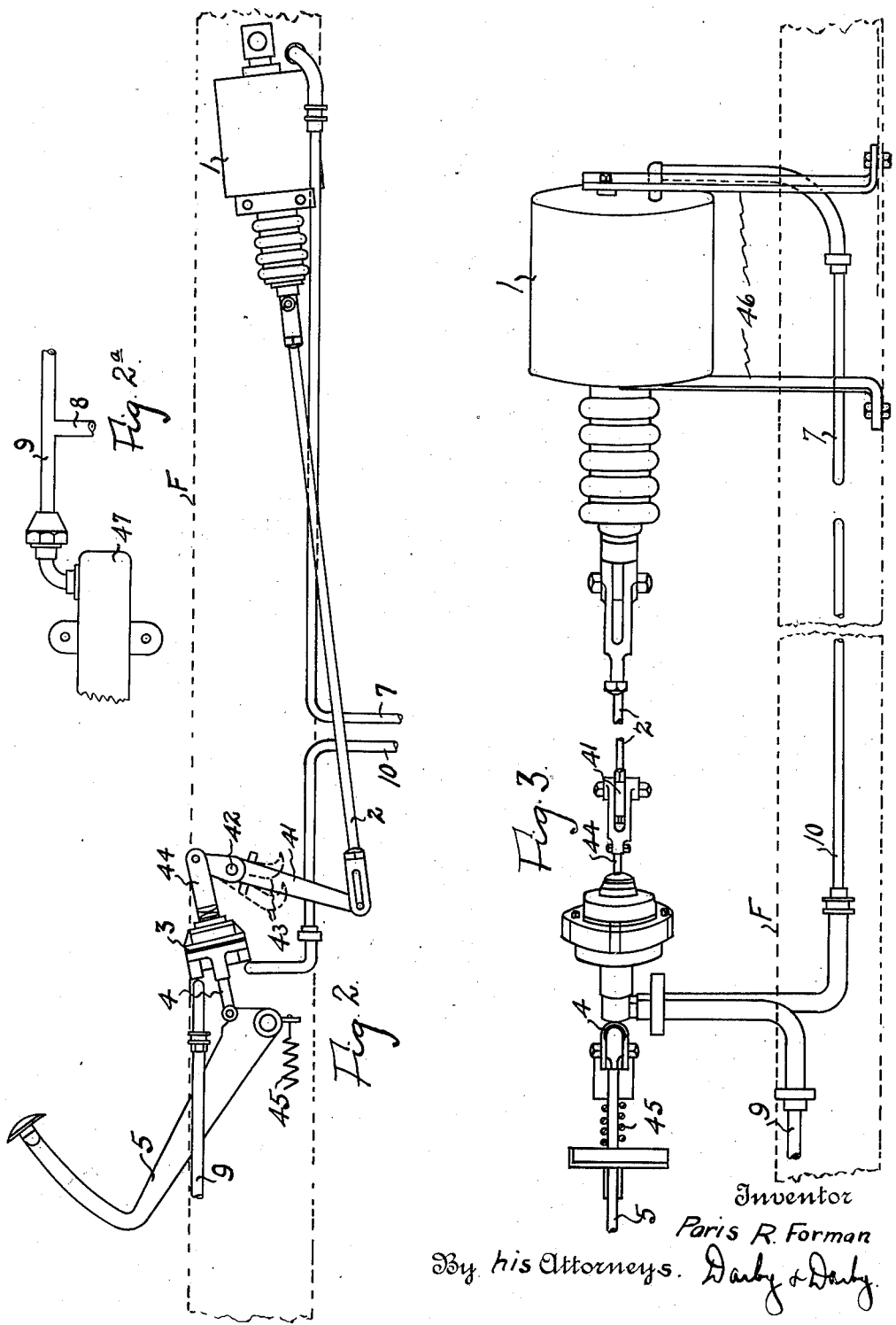

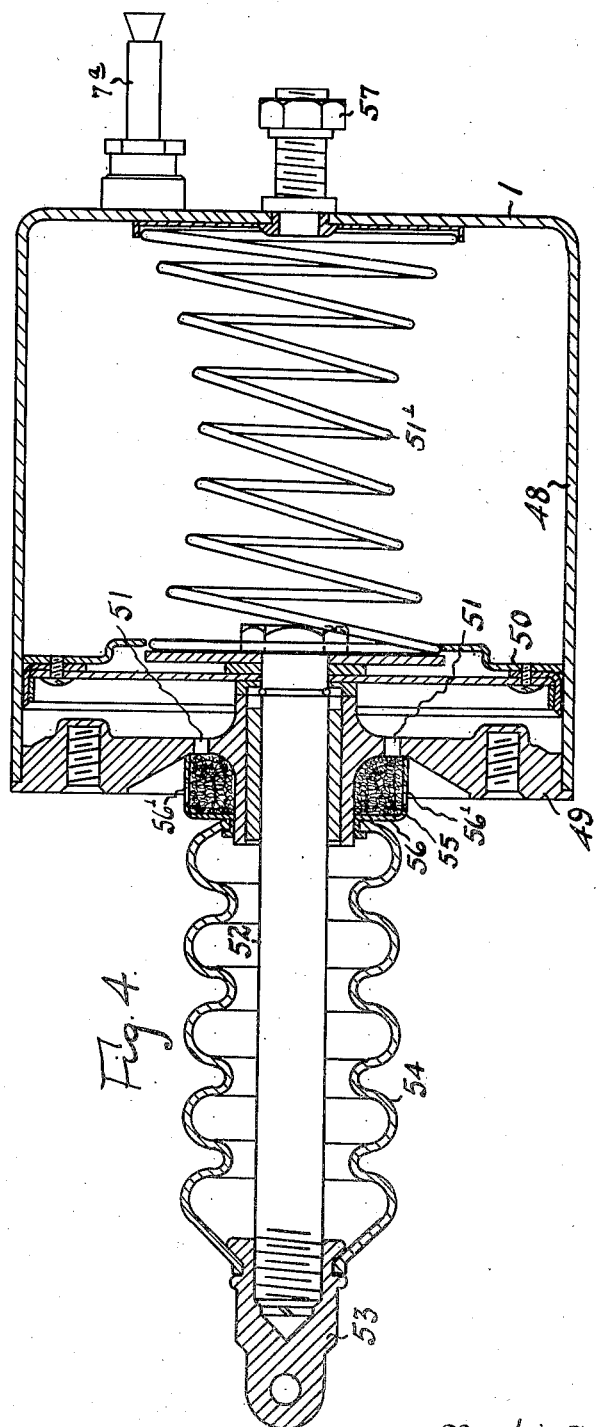

1,943,819

UNITED STATES PATENT OFFICE 1,943,819

INTERCONNECTED BRAKE AND DOOR SYSTEM FOR VEHICLES

Paris R. Forman, Rahway, N. J., assignor to National Pneumatic Company, New York, N. Y., a corporation of West Virginia Application March 19, 1931. Serial No. 523,715

6 Claims. (Cl. 303—6.1)

This invention relates in general to improvements in a system for operating the brakes and doors on vehicles.

One of the objects of this invention is the provision in a system of this type of interconnected apparatus by means of which upon the operation of the brake control means the door operating means is set for manual control.

A further object of this invention is the provision of an apparatus of this type which employs a treadle control for the doors.

A still further object of this invention is the provision of an improved system which precludes any possibility of placing the doors under the control of the treadle when the brakes are not applied.

A still further object of this invention is the provision in a system of this nature of interconnected means employing such a treadle which when actuated by a passenger prevents the closing of the doors and the releasing of the brakes.

A still further object of this invention is the provision of a system which is set for further operation either with or without a treadle and/or with or without a manual control switch upon the application of the brakes.

These and many other objects as will appear from the following disclosure are secured by means of this invention.

This invention resides substantially in the combination, construction, arrangement, and relative location of parts, all as will be described fully below.

This application is a continuation in part of my copending application Serial No. 420,675, filed January 14, 1930.

Referring to the drawings—

Figure 1 is a diagrammatic view showing the operative association of all the elements in this invention.

Figs. 2 and 2a taken together represent an elevational view of the brake pedal, the brake operating cylinder, the control valve and the connection to a vacuum source;

Fig. 3 is a top plan view of the structure in Fig. 2;

Fig. 4 is a vertical cross-sectional view through the brake operating cylinder;

Fig. 7 is a view partly in cross-section and partly in elevation showing the electromagnetic valves for controlling the door engine.

Figure 5:
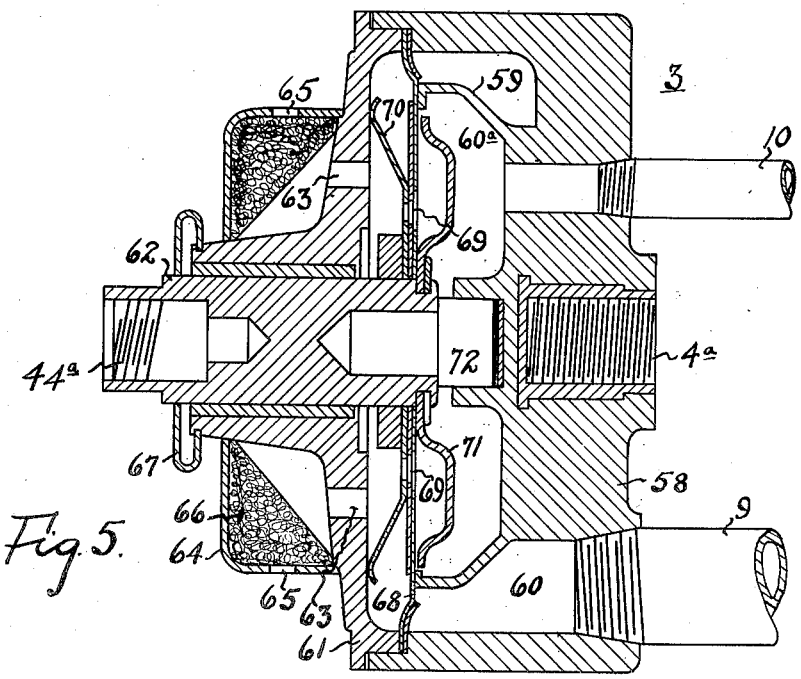
Fig. 5 is a vertical cross-sectional view through the valve which is operated by the pedal lever.

This invention may, of course, be applied to any form of vehicle the motion of which is arrested by the use of brakes and which has power operated doors thereon. The disclosure in the drawings is set forth in connection with automotive vehicles such as, for example, buses, but it is, of course, apparent that the principles of the invention may be applied to any movable vehicle having power operated brakes and doors.

Broadly the invention involves the use of the vacuum created in the intake manifold of the internal combustion engine which is normally employed on such buses for driving them. The invention is, of course, not limited to the use of such a vacuum source since any source of vacuum such as a vacuum pump may be employed, especially on vehicles which are not driven by internal combustion engines. The door and brake operating apparatus is interconnected and connected to the vacuum source through control valves so that the doors cannot be opened until the brakes are applied nor closed until they are released. In addition, the system employs a treadle switch controlled circuit and magnet valves in the connections to the door engine so that the final operation of opening the door is under the control of the treadle. In addition, the circuits employed may include manually controlled switches if desired which until operated keep the circuits out of the control of the treadle switch. Originally neither the manual switch nor the treadle switch can exert any influence on the apparatus until the brake pedal has been operated to initiate the operation of the brake engines. Other features of invention are involved in this system as will now be pointed out in detail in connection with the drawings.

All the essential elements comprising this system have been disclosed diagrammatically in Figure 1. The vacuum brake engine is shown generally at 1 connected through a rod 2 to the pedal controlled valve 3 which, in turn, is connected by rod 4 to the foot lever 5. At 6 is a combined valve and switch which has a pipe connection 7 leading to the vacuum engine 1, a pipe connection 8a leading to the pipe 9 through a pipe 8, which is connected at one end to valve 3 and at the other end to the vacuum source, a pipe connection 8 with two branches leading to the electromagnetically controlled valves 15 and 16, a pipe connection 10 also leading to valve 3, and a pipe 11a extending to a small vacuum engine 11 for operating the switch 12. Valve 6 is controlled by a small vacuum engine 13 whose piston is connected to the valve stem of valve 6, as represented by the connection 75. Mounted on this connection 75 is a contact arm 14. A pipe leads from magnet valve 15, as shown at 17, to the engine 18. The pipe 19 connected to this engine connects at its other end to the vacuum source. This vacuum engine is of the well known differential type with the smaller piston in cylinder 19$^a$ always exposed to atmospheric pressure. The larger piston is exposed on one side to the vacuum source through pipe 17. Pipe 19 maintains a continuous vacuum within the cylinders of the engine between the right hand face of the large piston and the left hand face of the piston in cylinder 19$^a$. This is, of course, all well known in the art but is briefly described here so that the complete operation of this system will be understood.

A wire 20 is connected to the positive side of a suitable current source and is connected through a suitable switch 21 and fuse 22 through wire 23 to one of the fixed contacts controlled by contact arm 12. The other fixed contact similarly controlled is connected by wire 24 to one contact by a push button switch 25. The other contact of this switch is connected by wire 26 to a fixed contact adjacent contact arm 14. A wire 27 connects wire 26 with the interlock switch 28. One terminal of the solenoid winding of the electromagnet valve 16 is grounded and the other terminal is connected by wire 29 to wire 27. Wire 24 is connected by wire 30 to one terminal of a suitable switch 31 which has its other terminal connected by wire 32 to one of the contacts of the treadle controlled switch 33. Wire 30 is also connected by wire 35 to a fixed contact controlled by contact arm 14. Wire 32 is also connected by wire 32$^a$ to one terminal of the solenoid winding of electromagnet valve 15 which has its other terminal grounded. The third contact controlled by contact arm 14 is connected by wire 34 to the other contact of treadle switch 33. A wire 36 leads from the interlock switch 28 through signal lamp 37 to ground. Wire 38 interconnects wire 23 and another contact on interlock switch 28. The interlock switch may be of any suitable construction comprising, for example, a movable drum having two contacts 39 and 40 thereon arranged in one position (as shown) to bridge wires 36 and 38, and in the other position to interconnect wires 27 and 38. When the door is closed switch 28 is in the position shown in Figure 1 and light 37 is burning, indicating the door is closed. When the door is opened switch 28 is in its other position directly connecting magnet valve 16 to the current source holding the door open and the brakes applied. Switch 28 is operated by the door in any well known manner so as to be in the position shown when the door is closed and in a position so that wires 27 and 38 are connected when the door is open.

The operation of the entire system will be described after the various elements making up the system have been described in detail.

As shown in Figs. 2, 2a and 3, the connections between the valve 3, the foot lever, and the brake operating engine have been shown in one operative form. The connecting rod 2 is pivotally attached to a lever 41 which is mounted on a short stud shaft 42 to which are secured the hooks 43. The brake operating rods are connected to these hooks 43 so as to be operated by the engine 1 through the connections shown. The stem of valve 3 is connected by link 44 to lever 41. On its other side the casing of this valve 3 is connected by a short rod 4 to the brake controlled pedal 5 which moves in a counter-clockwise direction when pressure is applied thereto. Spring 45 normally holds it in the position shown in the drawings. Pipe 7 is connected to the right hand end of the cylinder of engine 1 and valve 3 to the pipe connection 10 and the pipe 9 which extends to the vacuum source. The engine 1 as shown in Fig. 3 is supported on the frame F of the vehicle by means of brackets 46.

The vacuum brake operating engine is shown in greater detail in Fig. 4. It comprises a cylinder 48 which is closed at one end by the member 49. This cylinder is supported by studs 57, for example, and is connected to pipe 7 through the nipple 7$^a$ supported thereon and through which communication is had with the cylinder. The member 49 is provided with a series of holes or openings 51 which are enclosed by means of a casing 56 likewise having vents or openings 56' therein as shown. Within the casing 56 is any suitable porous material 55 through which the air must filter as it enters and leaves the cylinder. This acts to keep some moisture and all of the dirt and foreign material in the air from entering the cylinder. A spring 51', which presses against the piston, normally holds it in the position shown in this figure. Piston 50 is provided with a piston rod 52 having a connecting member 53 thereon to which rod 2 is connected. The piston rod is tightly sealed within a flexible leather casing 54 to protect it from dirt, moisture, etc.

Valve 3 is shown in detail in Fig. 5 as comprising a casing 58 and a cover 61 therefor which holds a flexible diaphragm 68 in place to form an airtight seal therewith. The casing 58 is provided with an internal annular wall 59 which provides a seat for the diaphragm 68 in the position shown in Fig. 5. This construction provides chambers 60 and 60$^a$ which are not in communication when the diaphragm is seated as shown. Pipe 9 is in communication with chamber 60 and pipe 10 is in communication with chamber 60$^a$. The casing 58 is threadedly engaged by link 4 at 4$^a$. A short piston rod 62 extends through the cap 61 and is hermetically sealed and mechanically secured to the flexible diaphragm 68. The piston 62 is connected to link 44 at 44$^a$. The cap is also provided with vents 63 which are in communication with the atmosphere through the porous material 66 within a casing 64 which likewise has vents as shown at 65. A flexible leather seal 67 extends around piston rod 62 to prevent the passage of foreign matter and dirt thereby. The piston rod 62 also supports a spring member 70 which presses against the cap 61 and normally maintains the diaphragm 68 seated against the annular wall 59. The diaphragm 68 is provided with vents 69 which lie within a centrally grooved disc 71 firmly secured to piston rod 62. When the parts are in the position shown chamber 60$^a$ is in communication with the atmosphere through vents 69, 63 and 65. At this time disc 71 is not seated on the diaphragm 68. Piston rod 62 is provided with a short extension 72 which slidingly fits in a recess in the casing 58 to guide the movement of the piston rod.

Figure 6:
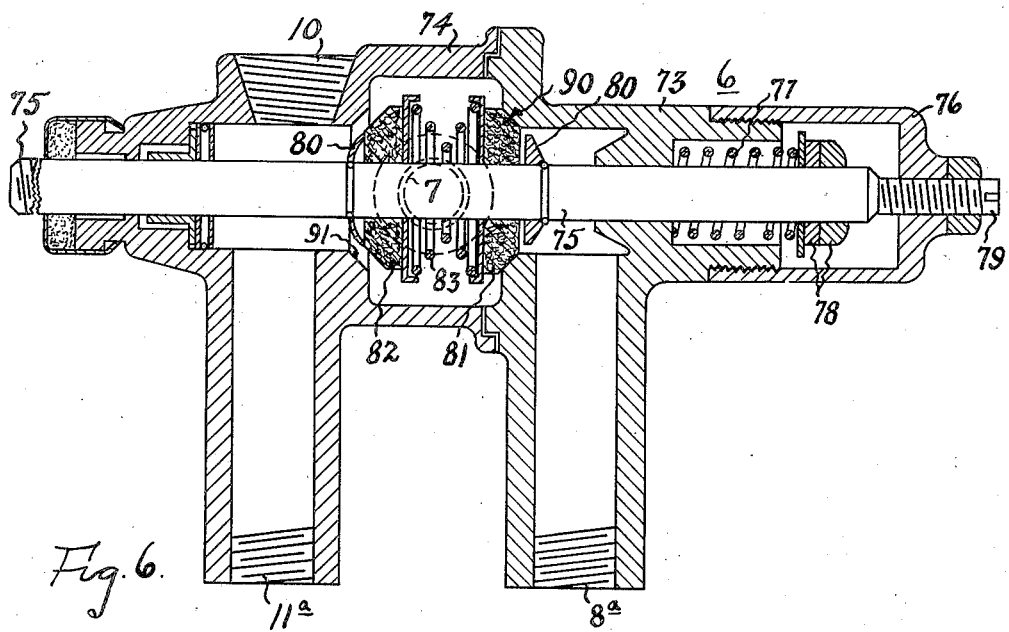
Fig. 6 is a longitudinal cross-sectional view through the control valve which interconnects the brake cylinders and door operating engine and the vacuum source.

Valve 6 is shown in detail in Fig. 6 as comprising a two-part casing made up of the portions 73 and 74 which are normally hermetically sealed together. A rod or valve stem 75 is slidably fitted within the casing thus formed. The end of the part 73 of the casing is provided with a cap 76 into which the end of rod 75 extends. The extending end of this rod is encircled by a spring 77 which engages with the lock nuts 78 secured to the end of the valve stem 75. An adjusting screw 79 extends through the cap 76 and engages the end of the valve stem. The adjusting screw 79 is employed to adjust the position of the valve stem 75 and the valve 81 and 82 thereon with respect to their seats 90 and 91, respectively. The valve stem is provided with spaced stops 80 which are firmly secured thereto and between which lie the opposed valves 81 and 82 which are slidably mounted on the valve stem 75. A spring 83 lies between them and urges them in opposite directions against the stops 80. The part 73 of the casing is provided with the internal seat 90 which cooperates with the valve 81 and in a similar manner the part 74 is provided with an internal seat 91 which cooperates with valve 82. Part 73 of the casing is provided with a hollow extension to which pipe 8a is connected and in a similar manner part 74 is provided with a hollow extension to which pipe 11a is connected. Pipe 7 is connected to part 74 of the casing at 7. This part of the casing is also provided with a threaded port to receive pipe 10. The four threaded ports, as shown in this drawing, have been given the same reference numeral as has been applied to the pipe which connects to them as it is believed this will aid in more quickly understanding these details. Spring 77 normally maintains valve 81 at its seat 90 as shown in Fig. 6.

As already pointed out in connection with Figure 1 the valve stem 75 is connected to a piston in the small vacuum engine 13 so as to be operated thereby. It may be well to point out here that the small vacuum engines 11 and 13 are exactly the same in construction and general principles of operation as the vacuum brake operating engine shown in detail in Fig. 4 and only differ therefrom in the matter of size.

Referring to Fig. 7, the electromagnet valve constructions and their connection as used in this invention have been shown. They are shown comprising a casing 100 within which the solenoid winding 101 is mounted. The solenoid winding has a fixed core 102 and a movable armature 103. This armature may be moved manually by means of a pin 104 extending through the casing when desired. Slidably mounted in core 102 is a rod 106 which is adapted to be moved vertically downwardly by the plunger 103 and be urged upwardly by spring 107. Casing 100 has a hollow extension 105 within which the rod 106 lies. The passage within the extension 105 is divided into three chambers by means of plugs 108 and 109 through which rod 106 extends as shown. Rod 106 is provided with opposed valves 110 and 111 which cooperate respectively with seats formed on plugs 108 and 109. The space above plug 108 is open to atmosphere through the vent valve 110 and port 112. The small chamber 113 between the two plugs is in communication with pipe 14a in the case of magnet valve 16 and in communication with pipe 17 in the case of magnet valve 15. The small chambers 114 lying between plugs 109 and the caps which close the extensions 105 are in communication with each other through pipe 8a.

The operation of the apparatus will now be described in detail. Switch 21 is normally closed so that the current source is directly connected to the right hand contact controlled by switch arm 12. Switch 31 is normally open as is switch 25. Switch arms 12 and 14 are in the position shown and treadle switch 33 is open as shown, and interlock switch 28 is for normal operation in the position disclosed in Figure 1. When it is desired to bring the vehicle to a stop, pressure is applied to the foot lever 5 to rotate it in a counter-clockwise direction pulling rod 4 to the left and also pulling piston rod 62 to the left (see Fig. 5). As soon as rod 62 reaches the limit of its travel in casing 58 of valve 3, the valve 3 as a unit moves to the left pulling link 44 with it and rotating the hook arms 43 in a counter-clockwise direction by means of lever 41 and shaft 42. The pin and slot connection between 41 and 2 permits this. The brakes are thus applied by the operator's foot in the interim before the brake cylinder 1 takes effect. As a result diaphragm 68 is pulled off its annular seat 59, placing spring 70 under tension and causing the edge of disc 71 to seat thereon. As a result the communication between chamber 60a and the atmosphere is cut off through vents 69, 63 and 65 and at the same time chambers 60 and 60a are placed in communication. This causes pipes 9 and 10 to be in communication (see Fig. 5). Pipe 9 is, of course, connected to the vacuum source which is diagrammatically illustrated in Fig. 2a as the intake manifold 47 of an internal combustion engine. As a result the vacuum pipe 10 is connected to the vacuum source. Pipes 10 and 11a are connected through valve 6 so that the piston in the small vacuum engine 11 is forced upwardly, causing contact arm 12 to bridge its associated fixed contacts. Pipe 7 is connected to the vacuum source through valve 6 and pipe 10 (see Fig. 6). Pipes 8 and 8a are of course directly connected to the vacuum source. The brake cylinder 1 is then evacuated and its piston pulls rod 2 to the left to hold the brakes applied.

The bridging of its associated contacts by contact arm 12 completes the circuit from the current source up to switch 25. Thus now that the brakes are applied the circuit is partially placed under the control of the vehicle operator since current is supplied up to his switch. When the vehicle has come to a stop the operator closes switch 25 and, as a result, the circuit is completed through wires 26, 27, 29, the winding of magnet valve 16 to ground and back to the current source. As a result, valve 111 is unseated and valve 110 is seated cutting off the connection between pipe 14a and the atmosphere through vent 112. At the same time pipe 14a is connected through the now opened valve 111 with pipe 8 which is in communication with the vacuum source as previously described. Pipe 14a extends to the small vacuum engine 13 creating a vacuum on one side of the piston thereof causing it to move downwardly and with it contact arm 14, valve rod 75, and valves 81 and 82, compressing spring 77 (see Fig. 6). Contact arm 14 now bridges its associated contacts and current flows through wires 24 and 35 to the middle contact, through the contact arm 14 to wires 27 and 29, and finally to the magnet valve 16 to provide a holding circuit therefor. Thus switch 25 need only be momentarily depressed or sufficiently long to permit vacuum engine 13 to move contact arm 14 into bridging position. Current also flows through wire 34 to one contact of the treadle switch. The downward movement of the valve stem 75 unseats valve 81 and seats valve 82 cutting off communication between pipe 10 and pipe 7 and establishing communication between pipe 8a and pipe 7. The connection between pipes 11a and 10 is not disturbed. Pipes 8a and 8 being in communication, a vacuum is supplied from the source through pipe 8ª and valve 6 to cylinder 1 through pipe 7, so that the brakes remain applied. If a passenger has closed or now closes treadle switch 33 current then continues therethrough from wire 34 to wire 32ª and through the solenoid winding of magnet valve 15 to ground causing valve 110 of this magnet valve to seat and valve 111 to unseat. Pipe 17 is thus cut off from the atmosphere and connected through chambers 113 and 114 and pipe 8 to the vacuum source. This creates a suction in the left hand end of the large cylinder of engine 18 and, as a result, the pistons move to the left since the only force thereon is that produced by atmospheric pressure on the small piston exposed to the atmosphere. These pistons being connected by well known apparatus to the door cause it to open. It may be well to point out here that when magnet valve 15 is in the position shown in Fig. 7 pipe 17 is open to the atmosphere and since a vacuum is constantly maintained in the right hand end of the larger cylinder of engine 18 through pipe 19 the pistons will be all the way to the right as shown in Figure 1 so that the door is normally maintained closed.

The brakes cannot be released even if pressure is removed from pedal 5 so long as treadle 33 is depressed since magnet valves 15 and 16 remain operated so that the door is at the same time held open and valve 6 held in operated position by vacuum engine 13 so that vacuum engine 1 cannot be cut off from the vacuum source. However, as soon as treadle switch 33 is opened by the movement of the passenger therefrom magnet valve 15 is deenergized and the door immediately begins to close and continues to do so until fully closed. If pressure is now removed from pedal 5, or has already been removed therefrom, valve 3 is operated, or has already been operated, so that diaphragm 68 is again seated and space 60ª is open to the atmosphere. As a result switch arm 12 moves to open position, or has already done so, and current is cut off from wires 24 and 35. As soon as treadle switch 33 opens magnet valve 15 is deenergized and pipes 8 and 17 are disconnected permitting the doors to close. This moves switch 28 so that magnet valve 16 is deenergized and pipes 8 and 14ª are disconnected. Valve 6 is then returned by spring 77 to normal position to connect pipe 7 to the atmosphere and vacuum engine 1 returns to normal position to release the brakes under the influence of spring 51 (see Fig. 4). The apparatus is now all in normal running position with the brakes released and the doors closed. It may be well to point out that signal lamp 37 is always burning when the current is on with switch 28 in the position shown in the drawings. If after switch arm 12 has bridged its contacts it is desired to open the door the vehicle having been brought to rest, this may be accomplished even though treadle switch 33 is not closed merely by closing the switch 31 to supply current through switch 12, wire 30, switch 31, wire 32, and wire 32ª to the solenoid winding of magnet valve 15. This connects pipe 17 to the vacuum source and causes the door to open. This withdraws the air from the right hand end of cylinder 48 (see Fig. 4) so that piston 50 may be moved to the right comprising spring 51 because there is a vacuum on the right hand side of piston 50 and atmospheric pressure is acting on the left hand side. The movement of the piston draws rod 2 to the right of Fig. 2 rotating lever 41 and hooks 43 in a counter-clockwise direction to apply the brakes by power.

From the foregoing disclosure it will be apparent that I have embodied certain principles of construction and operation in a novel form of apparatus for the purposes set forth above. It will, of course, be apparent that these principles may be embodied in other physical forms and carried out in other ways without departing from the spirit and scope of this invention and I do not, therefore, desire to be strictly limited to the disclosure as given in an illustrative sense but rather to the scope of the invention as it is defined in the appended claims.

What I seek to secure by United States Letters Patent is:

1. In a door and brake operating system for vehicles, the combination comprising brake operating means, pedal actuated means for controlling the operation of the brake operating means, connections between both of said means including a valve and switch actuating means, door operating means, connections between the door actuating means and said valve including electromagnet valves, means for actuating said valve and a switch also actuated thereby and circuits including both of said switches and said electromagnet valves, said first switch being closed to partially complete the circuit to said magnet valves upon the movement of said pedal actuated means and one of said electromagnets being actuated to cause said means for actuating said valve and switch to operate to further complete the circuit to the other electromagnet valve.

2. In a door and brake operating system for vehicles, the combination comprising brake operating means, pedal actuated means for controlling the operation of the brake operating means, connections between both of said means including a valve and switch actuating means, door operating means, connections between the door actuating means and said valve including electromagnet valves, means for actuating said valve and a switch also actuated thereby and circuits including both of said switches and said electromagnet valves, said first switch being closed to partially complete the circuit to said magnet valves upon the movement of said pedal actuated means and one of said electromagnets being actuated to cause said means for actuating said valve and switch to operate to further complete the circuit to the other electromagnet valve, and means for completing the circuit to said other electromagnet valve to cause the operation of the door operating means.

3. In a door and brake operating system for vehicles, the combination comprising brake operating means, pedal actuated means for controlling the operation of the brake operating means, connections between both of said means including a valve and switch actuating means, door operating means, connections between the door actuating means and said valve including electromagnet valves, means for actuating said valve and a switch also actuated thereby and circuits including both of said switches and said electromagnet valves, said first switch being closed to partially complete the circuit to said magnet valves upon the movement of said pedal actuated means and one of said electromagnets being actuated to cause said means for actuating said valve and switch to operate to further complete the circuit to the other electromagnet valve, and passenger controlled means for completing the circuit to said other electromagnet valve to cause the operation of the door operating means.

4. In a door and brake operating system for vehicles, the combination comprising brake operating means, pedal actuated means for controlling the operation of the brake operating means, connections between both of said means including a valve and switch actuating means, door operating means, connections between the door actuating means and said valve including electromagnet valves, means for actuating said valve and a switch also actuated thereby and circuits including both of said switches and said electromagnet valves, said first switch being closed to partially complete the circuit to said magnet valves upon the movement of said pedal actuated means and one of said electro-magnets being actuated to cause said means for actuating said valve and switch to operate to further complete the circuit to the other electromagnet valve, and a treadle controlled switch adjacent the door and included in said circuits to complete the circuit to said other electromagnet valve to cause the operation of the door operating means.

5. In a door and brake operating system for vehicles, the combination comprising brake operating means, pedal actuated means for controlling the operation of the brake operating means, connections between both of said means including a valve and switch actuating means, door operating means, connections between the door actuating means and said valve including electromagnet valves, means for actuating said valve and a switch also actuated thereby and circuits including both of said switches and said electromagnet valves, said first switch being closed to partially complete the circuit to said magnet valves upon the movement of said pedal actuated means and one of said electromagnets being actuated to cause said means for actuating said valve and switch to operate to further complete the circuit to the other electromagnet valve, a treadle controlled switch adjacent the door and included in said circuits to complete the circuit to said other electromagnet valve to cause the operation of the door operating means, and means in said circuits which must first be actuated before said treadle controlled switch can complete the circuit in which it is included.

6. In a door and brake operating system for vehicles, the combination comprising brake operating means, pedal actuated means for controlling the operation of the brake operating means, connections between both of said means including a valve and switch actuating means, a switch actuated thereby, door operating means, connections between the door actuating means and said valve including electromagnet valves, means for actuating said valve and a switch also actuated thereby and circuits including both of said switches and said electromagnet valves, said first switch being closed to partially complete the circuit to said magnet valves upon the movement of said pedal actuated means and one of said electromagnets being actuated to cause said means for actuating said valve and switch to operate to further complete the circuit to the other electromagnet valve, means for completing the circuit to said other electromagnet valve to cause the operation of the door operating means, and a switch included in said circuits and actuated by the door to provide a holding circuit for the first actuated electro-magnet valve to maintain it actuated as long as the brakes are applied.

PARIS R. FORMAN.